United States Patent
Tan et al.

(10) Patent No.: US 9,942,200 B1
(45) Date of Patent: Apr. 10, 2018

(54) END USER AUTHENTICATION USING A VIRTUAL PRIVATE NETWORK

(71) Applicants: Dan Tan, Nanjing (CN); Lei Wang, Nanjing (CN); Bin Shi, Nanjing (CN); Liulin Yang, Nanjing (CN)

(72) Inventors: Dan Tan, Nanjing (CN); Lei Wang, Nanjing (CN); Bin Shi, Nanjing (CN); Liulin Yang, Nanjing (CN)

(73) Assignee: TREND MICRO INC., Shibuya-Ku, Tokyo (JP)

( * ) Notice: Subject to any disclaimer, the term of this patent is extended or adjusted under 35 U.S.C. 154(b) by 257 days.

(21) Appl. No.: 14/558,669

(22) Filed: Dec. 2, 2014

(51) Int. Cl.
*H04L 29/06* (2006.01)

(52) U.S. Cl.
CPC ...... *H04L 63/0272* (2013.01); *H04L 63/0281* (2013.01); *H04L 63/083* (2013.01); *H04L 63/0823* (2013.01)

(58) Field of Classification Search
CPC ............. H04L 63/0272; H04L 63/0281; H04L 63/0823; H04L 63/083
See application file for complete search history.

(56) References Cited

U.S. PATENT DOCUMENTS

| 8,239,668 | B1 * | 8/2012 | Chen | H04L 63/1408 706/45 |
|---|---|---|---|---|
| 8,307,413 | B2 * | 11/2012 | Smadja | G06F 21/34 713/172 |
| 8,549,300 | B1 * | 10/2013 | Kumar | H04L 9/3247 713/153 |
| 8,918,860 | B1 * | 12/2014 | Enderwick | H04L 63/0272 726/15 |
| 9,009,817 | B1 * | 4/2015 | Wieland | G06F 21/34 713/186 |
| 9,037,851 | B2 * | 5/2015 | Choi | G06F 21/32 713/159 |
| 9,258,295 | B1 * | 2/2016 | Nedeltchev | H04L 63/0823 |
| 9,654,463 | B2 * | 5/2017 | Brannon | H04L 63/0823 |
| 9,832,188 | B1 * | 11/2017 | Wieland | H04L 63/0853 |
| 2002/0093915 | A1 * | 7/2002 | Larson | H04L 63/0272 370/235 |
| 2002/0178355 | A1 * | 11/2002 | D'Sa | H04L 63/0823 713/156 |

(Continued)

*Primary Examiner* — Joseph P Hirl
*Assistant Examiner* — Stephen Gundry
(74) *Attorney, Agent, or Firm* — Beyer Law Group LLP (57) ABSTRACT

A user is provisioned for a Web service by supplying a user name and password. A digital certificate and VPN identifier are generated and downloaded to the user's computer. The VPN identifier and user identifier are stored into a database. The user accesses the Web service and establishes a VPN using the certificate and VPN identifier. A user identifier, user name or user password is not required. A gateway computer uses the VPN identifier to access the database previously established during the provisioning session to retrieve the user identifier. Retrieval of the user identifier validates that the computing device is authorized to use the Web service. The gateway computer stores the client IP address and a mapping to the user identifier into a database. A proxy server retrieves the user identifier from the database using the IP address and includes the user identifier in Web traffic for a remote computer.

20 Claims, 4 Drawing Sheets

Authentication System (56) References Cited

U.S. PATENT DOCUMENTS

| | | | | |
|---|---|---|---|---|
| 2005/0160290 A1* | 7/2005 | Moon | H04L 63/0272 | 726/5 |
| 2006/0117104 A1* | 6/2006 | Taniguchi | H04L 63/0272 | 709/225 |
| 2007/0088834 A1* | 4/2007 | Litovski | H04L 63/0272 | 709/227 |
| 2008/0172366 A1* | 7/2008 | Hannel | H04L 63/0272 | |
| 2009/0025080 A1* | 1/2009 | Lund | H04L 9/3273 | 726/15 |
| 2009/0119177 A1* | 5/2009 | John | G06Q 20/18 | 705/14.54 |
| 2009/0307142 A1* | 12/2009 | Mardikar | G06Q 20/1085 | 705/72 |
| 2010/0042848 A1* | 2/2010 | Rosener | G06F 21/32 | 713/184 |
| 2011/0214176 A1* | 9/2011 | Burch | G06F 9/455 | 726/15 |
| 2012/0110341 A1* | 5/2012 | Beigi | G06Q 20/3223 | 713/186 |
| 2012/0265642 A1* | 10/2012 | Weinberg | G06Q 20/108 | 705/26.44 |
| 2012/0265976 A1* | 10/2012 | Spiers | H04L 63/0218 | 713/2 |
| 2012/0278614 A1* | 11/2012 | Choi | G06F 21/32 | 713/159 |
| 2013/0055363 A1* | 2/2013 | Dattagupta | H04L 63/062 | 726/5 |
| 2013/0179676 A1* | 7/2013 | Hamid | H04L 9/08 | 713/150 |
| 2013/0205133 A1* | 8/2013 | Hess | H04L 63/0884 | 713/155 |
| 2013/0205380 A1* | 8/2013 | Avni | H04L 63/0853 | 726/7 |
| 2013/0212667 A1* | 8/2013 | Mullick | H04L 63/0272 | 726/10 |
| 2013/0219164 A1* | 8/2013 | Hamid | H04L 63/0485 | 713/150 |
| 2013/0247147 A1* | 9/2013 | Pontillo | H04W 12/02 | 726/3 |
| 2013/0297933 A1* | 11/2013 | Fiducia | H04L 63/0853 | 713/156 |
| 2014/0020073 A1* | 1/2014 | Ronda | G06F 21/31 | 726/7 |
| 2014/0258711 A1* | 9/2014 | Brannon | H04L 63/0823 | 713/156 |
| 2014/0351581 A1* | 11/2014 | Pritikin | H04L 9/006 | 713/158 |
| 2015/0046994 A1* | 2/2015 | Sinha | H04L 41/0806 | 726/7 |
| 2015/0052595 A1* | 2/2015 | Murphy | G06F 21/54 | 726/7 |
| 2015/0052599 A1* | 2/2015 | Champagne | H04L 63/0272 | 726/12 |
| 2015/0095999 A1* | 4/2015 | Toth | H04L 63/08 | 726/6 |
| 2015/0121076 A1* | 4/2015 | Wante | H04L 61/2528 | 713/171 |
| 2015/0195252 A1* | 7/2015 | Walter | H04L 63/08 | 726/6 |
| 2015/0312041 A1* | 10/2015 | Choi | H04L 9/3231 | 713/175 |
| 2015/0334110 A1* | 11/2015 | Bishop | H04L 9/3268 | 713/156 |
| 2016/0094546 A1* | 3/2016 | Innes | H04L 63/0823 | 713/156 |
| 2016/0112410 A1* | 4/2016 | Nedeltchev | H04L 63/0823 | 713/156 |
| 2016/0127904 A1* | 5/2016 | Ward | H04L 63/0442 | 713/176 |
| 2016/0219043 A1* | 7/2016 | Blanke | H04L 9/3263 | |
| 2017/0132623 A1* | 5/2017 | Choi | G06Q 20/3829 | |
| 2017/0171750 A1* | 6/2017 | Leedom, Jr. | H04W 12/04 | |
| 2017/0230361 A1* | 8/2017 | Toth | H04L 63/0861 | |
| 2017/0250807 A1* | 8/2017 | Brannon | H04L 9/0822 | |
| 2017/0324717 A1* | 11/2017 | Kravitz | H04L 9/006 | |

* cited by examiner

FIG. 1
Authentication System

END USER AUTHENTICATION USING A VIRTUAL PRIVATE NETWORK

FIELD OF THE INVENTION

The present invention relates generally to authenticating a user of a computer. More specifically, the present invention relates to authenticating by means of a virtual private network.

BACKGROUND OF THE INVENTION

Historically, computer users (whether individuals or enterprises) have purchased software and installed it upon their computers for execution. This "on-premises" software often required ongoing maintenance fees and upgrades, as well as outright replacement. In the 1990s, though, the expansion of the Internet, greater broadband Internet access, and other factors led to software that is centrally hosted rather than being installed on customer's own machines.

This "on-demand software" or "software as a service" (SaaS) executes on a server computer remote from a client, and is accessed over the Internet by a client computer in order to receive the service that the software provides. The software may be third-party independent software from any of a variety of vendors, or may be software developed and managed by the SaaS vendor. Such software is popular because typically only an Internet browser is required on the client computer (or perhaps thin client software), any data is stored on the remote computer server, and software lifecycle costs are less than traditional on-premises software. Typical SaaS business applications include customer relationship management, human resource management, invoicing, accounting, databases, etc.

Because there may be numerous end users within a particular enterprise needing to access the SaaS Web site, each end user needing to be authenticated, proper authentication of each user and the associated Web traffic can be a problem. Or, an entity that supplies software-as-a-service over an Internet connection may need to verify that an individual end user who is attempting to use the service is actually a valid end user who has paid for the service. One prior art technique uses source IP-based authentication. With a traditional on-premise software product this technique may be effective within a typical user network, but a SaaS service is quite different because it is centrally hosted. Using this technique, the Internet gateway will not add the user's original IP address to any Web request of the SaaS service. Thus, the SaaS site will not be able to see the end user's internal IP address and cannot properly perform authentication.

Another prior art technique uses cookie-based authentication. Currently, many SaaS sites rely upon browser cookies in order to perform user authentication. But, there are a variety of scenarios in which this approach will not work. For example, this technique will not work in a non-browser application, cross-origin resource-sharing (CORS) request because the client application will not send cookies for such cases. Additionally, it is a big challenge to authenticate the HTTPS traffic if "man-in-the-middle" decryption is disabled. If disabled, any CONNECT request will not send a cookie, and the request cannot decrypt the traffic in order to inspect the cookie in an HTTPS payload.

In addition to software as a service, other Web sites that allow end users to connect and who must be authenticated may have difficulty in authenticating these users. Furthermore, requiring each end user to remember a user identifier and password, and to use them each time a session is initiated, can be burdensome. Moreover, loss of a computer or mobile device with a user identifier and password may lead to fraud if the device falls into the wrong hands.

For these and other reasons, a new technique and system are desired that provide accurate authentication of end users in conjunction with a SaaS Web site and with other Web sites that require authentication.

SUMMARY OF THE INVENTION

To achieve the foregoing, and in accordance with the purpose of the present invention, an authentication system is disclosed that authenticates a user of a Web service without requiring use of a user name and password.

An end user of a Web service is first authenticated by that service when the user accesses a Web portal and supplies a user name and password. A VPN identifier is generated for that user and a client certificate is downloaded to the user computer. At this point, the user has been provisioned and authenticated by the service and need not supply the user name and password when accessing the service in the future. For all subsequent accesses of the service, the user supplies the certificate and the VPN identifier and need not supply the user name and password. Aside from being more convenient, user names and passwords need not be written down or stored on the user's computer or mobile device. Accordingly, should the user lose a computer or mobile device the user name and password are not compromised. If a device is lost, the user simply accesses the portal again to generate a new VPN identifier and download a new client certificate.

In a first embodiment, a user accesses the Web service using a computing device and establishes a virtual private network using a digital certificate and a VPN identifier. A user identifier, user name or user password is not required. A gateway computer stores the client IP address and a mapping to the user identifier into a database. When needed by a server computer of the Web service, the server retrieves the user identifier from the database using the IP address and includes the user identifier in Web traffic. The gateway computer uses the VPN identifier to access a database previously established during the first authentication session in order to retrieve the user identifier. Retrieval of the user identifier validates that the computing device is authorized to use the Web service.

In a second embodiment, a user is provisioned for use of the Web service by first logging into a user portal and supplying a user name and password. A digital certificate and the VPN identifier are generated for the user and downloaded to the user's computing device. The VPN identifier and a unique user identifier are stored into the database. This authentication session ends; the user will be able to access and use the Web service, and be authenticated, using the VPN identifier and need not supply the user's user name or password.

In a third embodiment, the user is first provisioned using the portal computer as described above and the session ends. In order to establish a new session with the Web service in order to use the Web service, the user's computing device establishes a VPN connection with a VPN gateway of the Web service. The user's IP address and VPN identifier are passed to the gateway computer. The VPN identifier is used by the gateway computer to retrieve a unique user identifier from a previously established database. Retrieval of this unique user identifier confirms that the computing device is authorized to use the Web service.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention makes use of a virtual private network (VPN) in a novel way in order to provide end-user authentication. A VPN is known in the art, and, as its name implies, provides the benefits of a private data network (such as security) to users of a public network. When using a VPN, a computer user can send and receive data across a shared or public network (such as the Internet) while enjoying the privacy and security of a private network. There are different types of VPNs such as remote-access (connecting a single computer to a network), site-to-site (connecting two networks), etc.

In order to be effective, endpoints of a VPN are authenticated before the actual VPN is established. While remote-access VPNs may use passwords, biometrics or other cryptographic methods, network-to-network VPNs often use passwords or digital certificates. Nevertheless, digital certificates may be used for authentication in all types of VPNs. As is known in the art, certificates are issued by a certificate authority (CA) as proof of identity. Certificates are often preferred over cryptographic keys for authentication because certificates are more scalable, and are not bound to a particular IP address. Thus, remote users with a dynamic IP address can still be authenticated using identification information in the certificates. In addition, use of certificates allows a computer to deny authentication to a user presenting a certificate contained in a Certificate Revocation List.

Although the below drawings and description discuss an example in which end-user authentication occurs in conjunction with software as a service, the present invention is applicable to any scenario in which a Web site desires to authenticate an end user.

Figure 1:
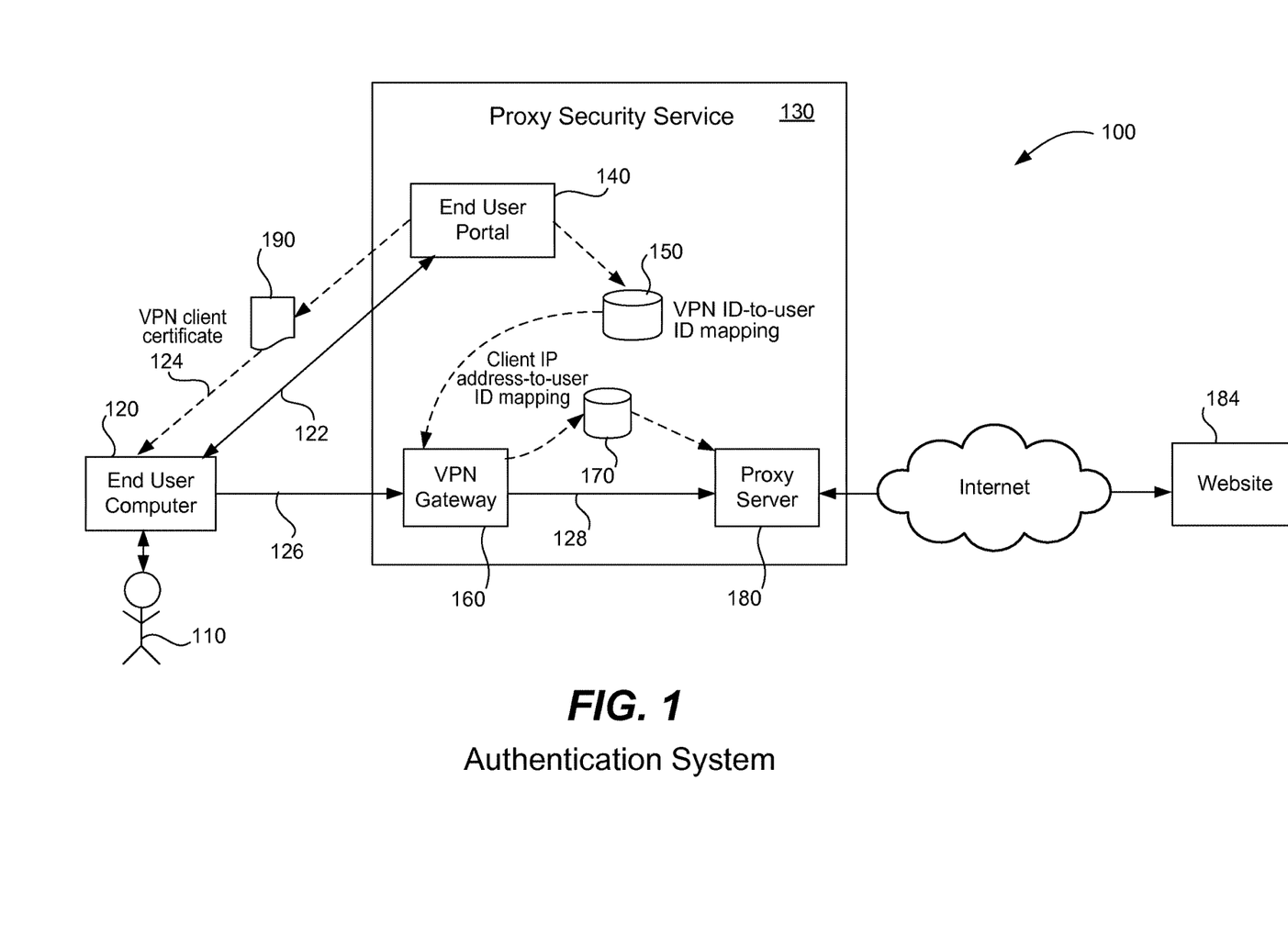
FIG. 1 illustrates an authentication system that includes an end user, an end-user computer and a proxy security service.

FIG. 1 illustrates an authentication system 100 that includes an end user 110, an end-user computer 120 and a proxy security service 130. Computer 120 may be any suitable computing device such as a desktop computer, laptop computer, tablet computer or mobile device (such as a mobile telephone). Proxy security service 130 includes a number of computers, software and databases available over the Internet that provides a particular service to the end user and to his or her corporate entity. Of course, service 130 is only an example of how the present invention may be implemented; the invention may be implemented in many other situations other than software as a service.

In this example, computers 140, 160 and 180 are distinct and each provides a particular functionality within the overall service. Of course, these functionalities may also be implemented upon a single computer. End-user portal 140 is a computer that implements a Web site allowing any end user to register for the service, log in to the service, download digital certificates, etc. VPN gateway 160 is any suitable computer that implements virtual private network (VPN) software allowing a virtual private network (or VPN "tunnel") to be established between end-user computer 120 and gateway 160. Proxy server 180 is a computer that functions as a proxy between the end-user computer and any Web site 184 accessible over the Internet. Preferably, these computers communicate with one another using TCP/IP and the HTTP protocol. Databases 150 and 170 may be implemented upon any one of these computers. Database 150 provides a mapping from a user's unique VPN identifier to a user identifier. Database 170 provides a mapping from a user's IP address to the user's identifier.

In this example, an end user (or corporate entity) first configures the proxy server to enable it to function as a proxy for any destination Web site in order to protect data traffic. When the user attempts to visit any Web site on the Internet (such as Web site 184) all Web traffic between the user and the destination Web site will pass through the proxy server 180. By virtue of it having access to all of this Web traffic, the proxy server may then provide any number of services such as: content scanning; implementation of a corporate Web policy; authentication; etc. In one embodiment, proxy server computer 180 is a standard proxy server and is implemented upon an AWS platform in the public cloud environment. Of course, computer 180 may be any suitable backend server computer and need not necessarily be a proxy server. In this embodiment though, service 130 is used to authenticate end user 110 in order to validate that the user has registered with and is authorized to use the proxy server 180.

Provision End User

Figure 2:
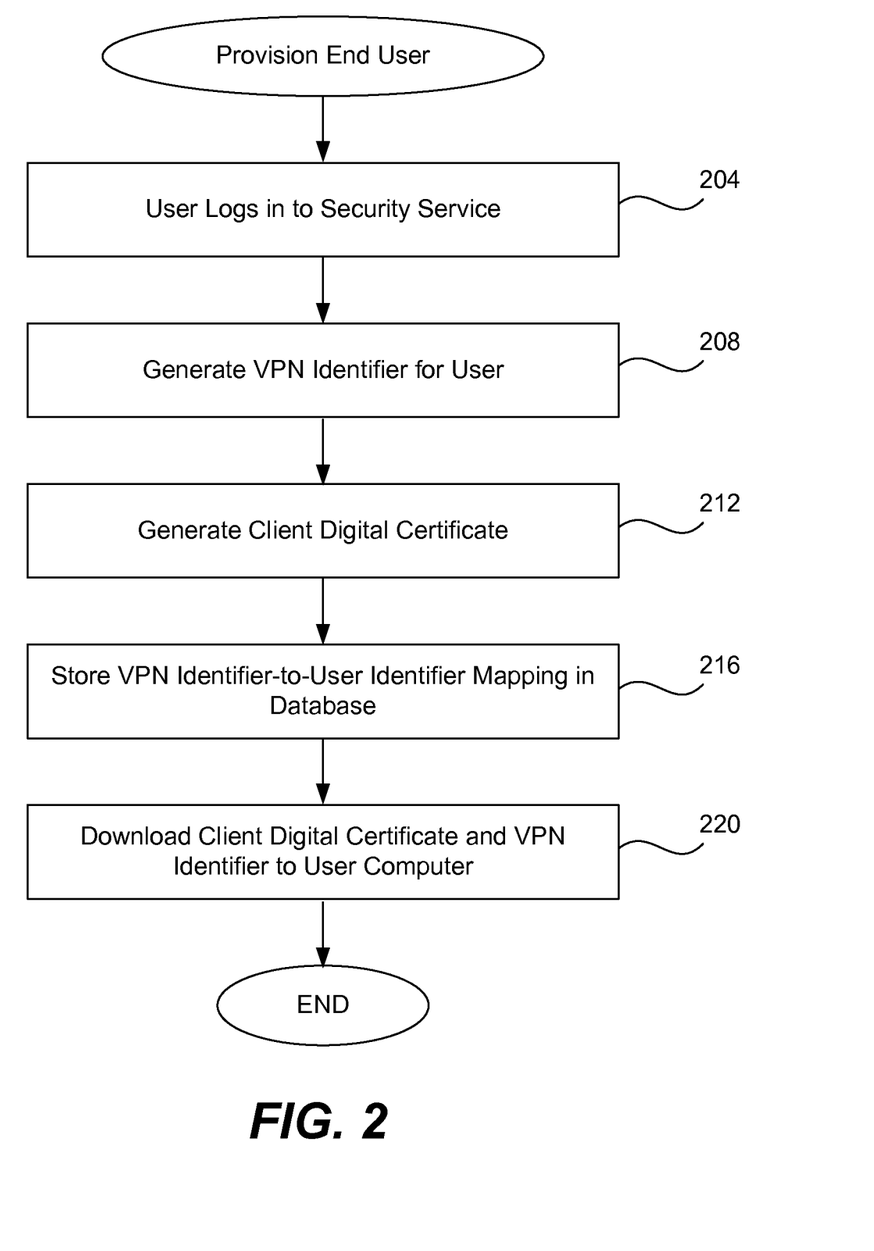
FIG. 2 is a flow diagram describing an embodiment in which an end user is provisioned in order to use the security service.

FIG. 2 is a flow diagram describing an embodiment in which an end user is provisioned in order to use service 130. Typically, a corporate entity will already have registered all of its users with a particular service such as service 130 and each user will already have an established user identifier and password. In step 204 user 110 accesses a Web site implemented on portal computer 140 via link 122 and logs into the proxy security service 130 using his or her user identifier and password. At this point, service 130 is in possession of the user identifier and password and has authenticated the user. Next, in step 208 portal computer 140 and associated software generates a unique VPN identifier for user 110 for use with VPN gateway 160. This identifier may be generated in many different ways. Preferably, the VPN identifier is a unique identifier for this particular user that distinguishes the user from amongst all other users of service 130. For example, the VPN identifier may be a random globally unique user identifier. The VPN identifier may be a universally-unique identifier (UUID), for example "123e4567-e89b-12d3-a456-426655440000," and may be generated using cryptography, random numbers, clocks, etc., as is known in the art.

In step 212 portal computer 140 generates a client digital certificate for end user 110. Generation of a digital certificate is a known step and may be performed in different manners depending upon the type of virtual private network that will be used. In one embodiment, the VPN uses the Internet Protocol Security (IPsec) suite and the digital certificate generated is common to all users, i.e., no unique identifying information is embedded within the digital certificate. In a variation on this embodiment, a unique client identifier is generated for use with XAuth PAM authentication for those devices that support XAuth, such as Apple telephones. In this variation, the unique client identifier may be used as the password of XAuth PAM. This variation will use the user identifier that was used to log on to the end user portal 140 as the PAM user name. VPN gateway 160 will be able to retrieve the user identifier and the unique client identifier from the XAuth PAM authentication interface.

In another embodiment, the VPN is an SSL VPN and each digital certificate has embedded within it the user's VPN identifier, thus generating a unique digital certificate for each end user. In yet another embodiment in which end user computer 120 is a mobile telephone using a mobile operating system (such as iOS available from Apple, Inc.), the digital certificate is generated by the backend of end user portal 140. This back end will specify the unique client identifier as the common name in the subject field and will sign the certificate. Then, the VPN gateway 160 retrieves the unique client identifier during SSL negotiation.

Next, in step 216 the newly generated VPN identifier and the user identifier (used by the user to login) are stored together in database 150. In other words, a simple mapping from the VPN identifier to the user identifier is stored. For example, the first field of a record in the database includes the VPN identifier and the second field includes the user identifier. In this fashion, once a VPN connection is established later on, the VPN identifier from that connection may be used as a key into the database in order to retrieve the user identifier in order to determine who precisely has established the VPN connection.

Finally, in step 220 the newly-generated client digital certificate 190 is downloaded over link 124 to end-user computer 120. This digital certificate is then stored in a suitable location on computer 120 for future use when user 110 will attempt to establish a VPN connection 126 with proxy security service 130. The VPN identifier also needs to be transferred from the end user portal 140 to the end user computer 120. Preferably, it is downloaded along with the certificate in step 220. For example, for an iOS operating system user, the VPN identifier is embedded in the profile package. In this example, step 220 includes downloading the iOS profile package to the user computer. For other operating systems where SSL VPN is used, the VPN identifier is embedded in the certificate.

Access Security Service

Once end user 110 (or any number of end users) has been provisioned for use with service 130, that end user may desire to log in to the service 130, be authenticated, and take advantage of services that the service provides such as content scanning, etc. Of course, user 110 may wish to log in to a particular service or Web site and be authenticated for other reasons as well. The present invention makes use of a VPN connection in order to provide authentication.

Figure 3:
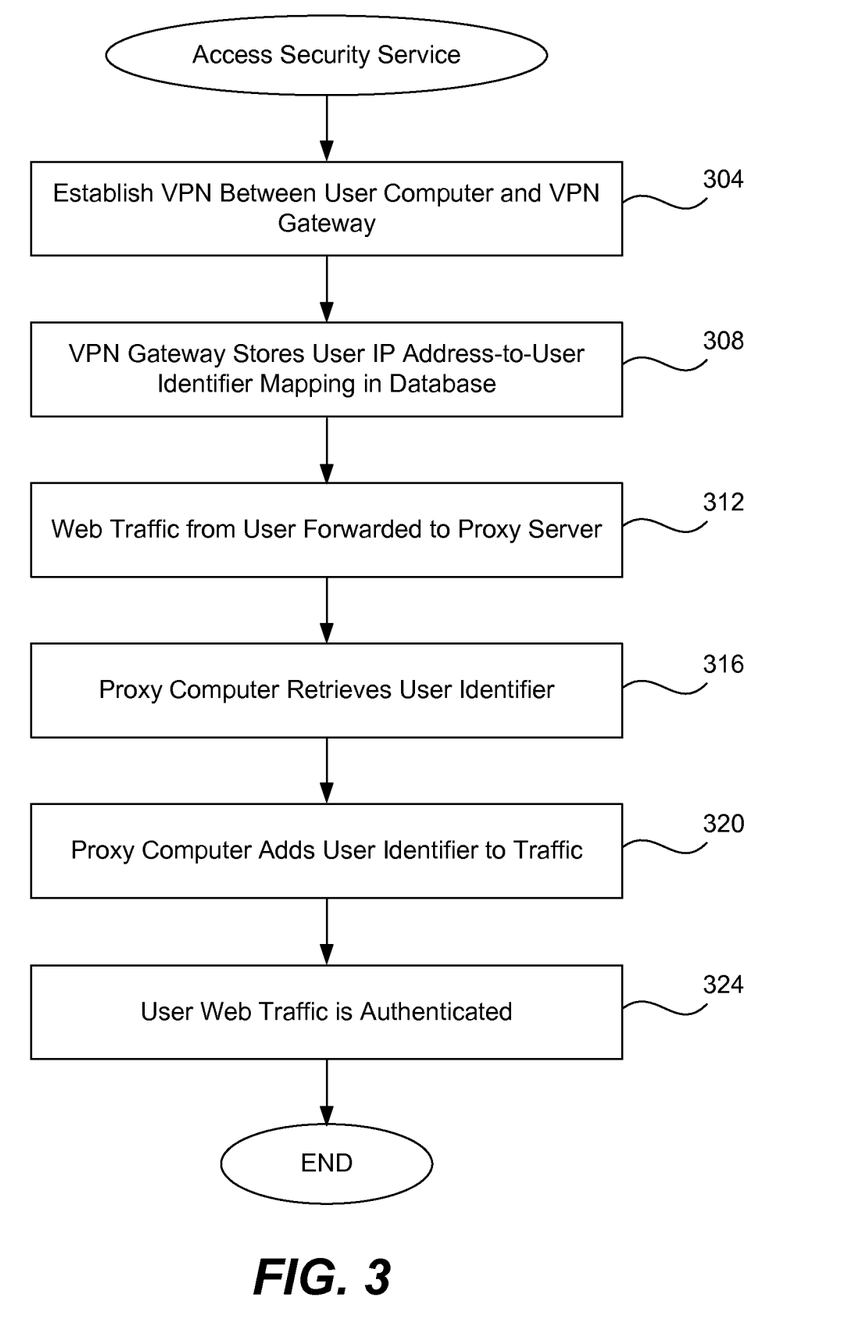
FIG. 3 is a flow diagram describing an embodiment in which an end user accesses and uses the security service.

FIG. 3 is a flow diagram describing an embodiment in which an end user accesses and uses the security service 130. In a first step 304 the end user initiates and establishes a virtual private network 126 between computer 120 and VPN gateway 160 using digital certificate 190. A VPN may be established in different manners and may be of any of a variety of types such as the VPN types mentioned above. The VPN identifier generated in step 208 is also passed from the end user computer to the VPN gateway in step 304 using a variety of techniques. For example, in the case of a VPN using IPsec, a VPN user name and password are needed to establish the VPN. The gateway first verifies the VPN certificate, then verifies the VPN identifier as described below, and then authenticates the user.

When computer 120 is a mobile device using the iOS operating system, a so-called "profile package" will be passed from the mobile device to the VPN gateway. This profile package includes not only the digital certificate but also a group of settings which include the user name and password needed to establish the VPN. The VPN identifier is written into this group of settings such that it also is passed from the mobile device to the VPN gateway when the VPN is established. Further, for mobile devices running the Apple iOS mobile operating system, the operating system supports on-demand VPN as a feature, and access may be granted to a user transparently without needing to manually turn on the VPN. In this situation, the end user portal 140 will configure the profile settings to enable this feature. Or, if an SSL VPN is used, the VPN identifier will be embedded into the digital certificate and it will be passed from the user computer to the VPN gateway when the certificate is transferred.

In general, when the client connects to the VPN gateway 160 to establish the VPN tunnel, VPN gateway 160 obtains the VPN identifier. Then, gateway 160 will authenticate the user by verifying the VPN identifier. As shown in FIG. 1, VPN gateway 160 is able to access the database 150 after the VPN tunnel has been established. If the VPN identifier exists in database 150, it is used to obtain the user identifier and verification of the user is a success. (Otherwise, user authentication fails and a VPN connection cannot be established.)

Because the VPN identifier/user identifier pair had previously been stored in database 150, the presence of this information in the database confirms that the end user is a valid end user authorized to use the proxy security service. For example, the mere presence of the VPN identifier in this database may signify that the end user currently accessing the proxy service is a valid user. Or, it may be required that a user identifier exist in this database before concluding that the end user is authorized. Since the profile package for an iOS user also includes the user identifier, gateway 160 will query the database with the VPN identifier and check whether the user identifier matches in order to authenticate the user.

In addition, the IP address of computer 120 is also supplied to VPN gateway 160 as part of establishing the VPN. Typically, both the IP address and the VPN identifier are supplied to the VPN gateway when establishing VPN 126, but, once established, all further traffic (or packages) from the user computer need contain only the IP address and not the VPN identifier. As mentioned earlier, database 170 provides a mapping from a user's IP address to the user's identifier.

Accordingly, in step 308 when the VPN is established both the user IP address and the user identifier are stored into database 170. For example, a record in this database includes the IP address in a first field and the user identifier in a second field. The IP address may then be used as a key into this database to retrieve the user identifier. Once this data has been stored upon establishing the VPN, it need not be stored again for the remainder of that VPN session. One reason for this is to provide high availability. For instance, if the proxy server were to crash, mapping information would be lost. This design puts the mapping information into persistent storage to avoid the lost data.

Once the VPN is established and the mapping stored in the database, all Web traffic between the user computer and Web site 184 in step 312 (and continuously) will pass through the proxy server 180. In one specific embodiment, authentication of the user is required before the proxy server will provide its various services such as content scanning, implementation of corporate policy, etc. Of course, authentication of the user may be provided at this point for other reasons. In order to perform authentication of the user, in step 316 the proxy server first retrieves the user identifier. Since the client browser has sent the HTTP request to proxy server 180, the proxy server is able to query database 170 and retrieve the user identifier using the client's IP address. After the proxy computer retrieves the user identifier, then in step 320 the proxy computer optionally adds the user identifier to the header of all traffic from the user computer.

Accordingly, in step 324 the Web traffic has been authenticated as belonging to a valid end user 110 assuming that the VPN identifier exists or if the user identifier belongs to a currently paid up user. On the other hand, if the VPN identifier does not exist in the database, or even if the VPN identifier exists, but the user identifier belongs to a user who does not exist, whose license has expired, or to a user whose account has not been paid or whose account has expired or has been disabled, then it is determined that the traffic is not associated with a valid end user.

If it is determined that the end user is a valid user and that the traffic is authenticated, then all Web traffic between the computer 120 and the Web site 184 is allowed to flow through the proxy server. In addition, the proxy server will then perform its services on the Web traffic as explained above as part of its role within the proxy security service 130. On the other hand, if there is no VPN identifier in the database or if the user is not valid, then the proxy server may determine that it will not perform any of its functions. Furthermore, the proxy server may further decide that no Web traffic between computer 120 and Web site 184 will be permitted.

Thus, authentication processing occurs within server 130. If the user is authenticated successfully, a VPN connection will be established, and the proxy server will use the user identifier for policy matching, Web access logging, etc. Otherwise, the VPN connection will fail and no traffic is forwarded to the proxy server In an alternative embodiment, if an existing SaaS proxy service requires end user authentication, it may face issues for non-browser CORS requests. The present invention may be extended to an existing SaaS proxy service remote from proxy server 180 in order to resolve these authentication issues. For example, because proxy server 180 has obtained the user identifier from database 170, it may forward the Web traffic to any SaaS proxy service. And, it will add the user identifier to all headers of the HTTP traffic. In order to avoid the user identifier being forged, the header will be encrypted using a symmetric encryption algorithm or similar. The SaaS proxy service then retrieves the user identifier from the header in order to perform authentication.

Computer System Embodiment

Figure 4A:
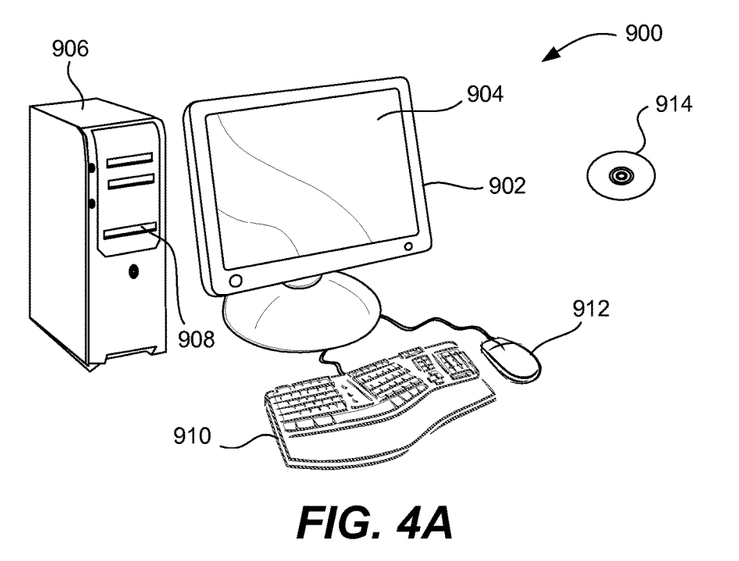
FIGS. 4A and 4B illustrate a computer system suitable for implementing embodiments of the present invention.
Figure 4B:
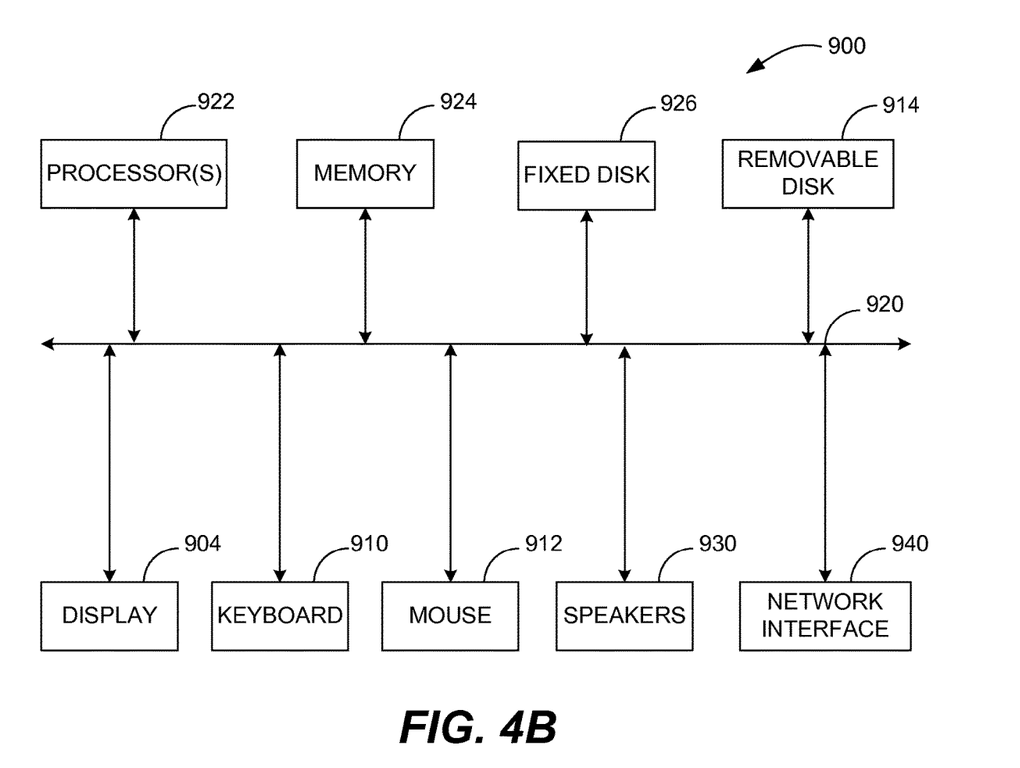

FIGS. 4A and 4B illustrate a computer system 900 suitable for implementing embodiments of the present invention. FIG. 4A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 4B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of authenticating a user of a Web service, said method comprising:
   at a gateway computer of said Web service, receiving a request to establish a virtual private network (VPN) that includes a digital certificate and a VPN identifier from a user computing device, said VPN identifier being a unique identifier of said user;
   establishing said VPN between said user computing device and said gateway computer;
   retrieving, by said gateway computer, from a first database of said Web service a user identifier using said VPN identifier as a key into said first database, said user identifier being distinct from said VPN identifier and identifying said user;
   authorizing by said gateway computer, said user to use said Web service based upon said VPN identifier without requiring said user identifier and a password from said user; and
   authenticating, by a proxy server computer that provides said Web service, that said user identifier represents a valid user of said Web service and providing said Web service to said user via said proxy server computer and said gateway computer.

2. The method as recited in claim 1 further comprising:
   receiving an IP address of said user computing device during said establishing; and
   storing said IP address in conjunction with said user identifier in a second database of said Web service; and
   retrieving said user identifier from said second database by a server computer of said Web service using said IP address as a key into said second database.

3. The method as recited in claim 1 further comprising:
   performing said authenticating by determining that said VPN identifier exists in said first database.

4. The method as recited in claim 1 further comprising:
   performing said authenticating by determining that said user identifier exists in said first database.

5. The method as recited in claim 1 further comprising:
   performing said authenticating by determining that said retrieved user identifier matches a valid user identifier in possession of said gateway computer.

6. The method as recited in claim 2 further comprising:
   performing said authenticating by said server computer only via use of said IP address received from said user computing device.

7. The method as recited in claim 1 further comprising:
   performing said authenticating only via use of said VPN identifier received from said user computing device.

8. A method of provisioning a user of a Web service, said method comprising:
   receiving at a portal computer of a Web service a user name and a password from a user computing device;
   authenticating a user of said Web service using said user name and said password;
   generating a digital certificate and a virtual private network (VPN) identifier for said user, said VPN identifier being a unique identifier of said user;
   storing in a first database of said Web service a mapping from said VPN identifier to a user identifier that is distinct from said VPN identifier and uniquely identifies said user within said Web service; and
   downloading said digital certificate and said VPN identifier to said user computing device, whereby said user may establish a VPN with said Web service using said digital certificate and said VPN identifier in order to be authorized and to receive said Web service via a proxy server computer of said Web service without requiring said user identifier and a password from said user.

9. The method as recited in claim 8 further comprising:
   performing said authenticating and downloading by said portal computer.

10. The method as recited in claim 8 wherein said digital certificate includes said VPN identifier.

11. The method as recited in claim 8 wherein said digital certificate is common to any user of said Web service.

12. The method as recited in claim 8 further comprising:
    ending a session between said user computing device and said portal computer before any other connection between said user computing device and said Web service is established.

13. A method of authenticating a user of a Web service, said method comprising:
    at a portal computer of said Web service, authenticating an end user using a user identifier received from a user computing device, said user identifier identifying said user who is authorized to use said Web service;
    downloading a digital certificate and a virtual private network (VPN) identifier to said user computing device, said VPN identifier being a unique identifier of said user and being distinct from said user identifier;
    storing said VPN identifier and said user identifier in association with each other in a first database of said Web service;
    establishing a VPN between said user computing device and a gateway computer of said Web service;
    retrieving, by said gateway computer, from said first database of said Web service said user identifier using said VPN identifier as a key into said first database; and
    authorizing, by said gateway computer, that said user computing device represents a valid user of said Web service based upon said VPN identifier without requiring said user identifier and a password from said user; and
    authenticating, by a proxy server computer that provides said Web service, that said user identifier represents a valid user of said Web service and providing said Web service to said user via said proxy server computer and said gateway computer.

14. The method as recited in claim 13 further comprising:
    ending a session between said user computing device and said Web service after said storing; and
    beginning a new session between said user computing device and said Web service upon said establishing.

15. The method as recited in claim 13 further comprising:
    receiving a request to establish said VPN from said user computing device that includes a digital certificate and said VPN identifier.

16. The method as recited in claim 13 further comprising:
    receiving an IP address of said user computing device during said establishing; and
    storing said IP address in conjunction with said user identifier in a second database of said Web service; and
    retrieving said user identifier from said second database by a server computer of said Web service using said IP address as a key into said second database.

17. The method as recited in claim 13 further comprising:
    performing said authenticating by determining that said VPN identifier exists in said first database.

18. The method as recited in claim 13 further comprising:
performing said authenticating by determining that said user identifier exists in said first database.

19. The method as recited in claim 13 further comprising:
performing said authenticating by determining that said retrieved user identifier matches a valid user identifier in possession of said gateway computer.

20. The method as recited in claim 13 further comprising:
performing said authenticating without receiving said user identifier or a password from said user computing device.

\* \* \* \* \*